(12) United States Patent
Solin

(10) Patent No.: US 7,450,702 B2
(45) Date of Patent: Nov. 11, 2008

(54) CALL SCREENING FOR FAX TELEPHONE NUMBERS

(75) Inventor: Patricia R. Solin, Boca Raton, FL (US)

(73) Assignee: AT&T Intellectual Property I, L.P., Reno, NV (US)

(*) Notice: Subject to any disclaimer, the term of this patent is extended or adjusted under 35 U.S.C. 154(b) by 667 days.

(21) Appl. No.: 10/351,964

(22) Filed: Jan. 27, 2003

(65) Prior Publication Data

US 2004/0146153 A1   Jul. 29, 2004

(51) Int. Cl.
*H04M 11/00* (2006.01)
(52) U.S. Cl. ............................. 379/100.01; 379/100.05; 379/100.06; 358/468; 358/440
(58) Field of Classification Search ............ 379/100.01, 379/100.05, 100.06; 358/468, 440
See application file for complete search history.

(56) References Cited

U.S. PATENT DOCUMENTS

| | | | |
|---|---|---|---|
| 5,473,671 A | 12/1995 | Partridge, III | 455/445 |
| 5,497,414 A * | 3/1996 | Bartholomew | 379/142.02 |
| 5,517,556 A * | 5/1996 | Pounds et al. | 379/88.25 |
| 5,651,053 A | 7/1997 | Mitchell | 379/210.02 |
| 5,930,700 A * | 7/1999 | Pepper et al. | 455/435.3 |
| 6,058,169 A * | 5/2000 | Bramnick et al. | 379/100.01 |
| 6,463,129 B1 * | 10/2002 | Park | 379/67.1 |
| 6,477,246 B1 * | 11/2002 | Dolan et al. | 379/211.02 |
| 2002/0191226 A1 * | 12/2002 | Huang | |
| 2003/0053143 A1 * | 3/2003 | Maeda | 358/440 |
| 2003/0152198 A1 * | 8/2003 | Price | |

* cited by examiner

*Primary Examiner*—Quynh H Nguyen
(74) *Attorney, Agent, or Firm*—Withers & Keys, LLC

(57) ABSTRACT

A system for providing call processing services to one or more customers includes a network configured to receive, from a first client, a fax transmission attempt intended for a second client associated with a customer. A network call processor within the network is configured to screen a first fax telephone number corresponding to the first client and a second fax telephone number corresponding to the second client and determine whether to deliver a fax transmission to the second client.

19 Claims, 4 Drawing Sheets

CALL SCREENING FOR FAX TELEPHONE NUMBERS

TECHNICAL FIELD

The present invention relates generally to a communications system and, more particularly, to a network enabling call screening for facsimile (fax) telephone numbers.

BACKGROUND

Telecommunications services are an integral part of business and personal communications, allowing geographically remote parties to communicate irrespective of location. Because of the ease with which parties may contact each other, however, there may be occasions when communication can be viewed as an interruption rather than as a convenience. For example, unsolicited telephone calls from telemarketers often are perceived as intrusions not opportunities.

Increased competition has challenged telecommunications service providers to continuously offer new and improved services to customers. Some services have addressed the privacy concerns of customers. One example of such a service is caller identification (caller ID), which displays a telephone number and/or name associated with an incoming telephone call and provides the called party with the choice of receiving or ignoring the call. Another example is a call blocking service, which allows a subscriber to prevent telephone calls from anonymous parties and/or submit a list of telephone numbers to be blocked.

While certain advancements in technology have enabled telecommunications service providers to keep pace with the increasing demands of customers, telemarketers also have expanded their tactics. In particular, telemarketers recently have begun transmitting unsolicited fax message to homes and businesses. This practice can be especially frustrating for recipients due to the congestion of fax lines and the unwanted consumption of printing resources.

Providing new features and servers has long been a growing market for telecommunications providers. It would be advantageous for telecommunications providers and telecommunications customers alike to enable a service for preventing the receipt of unwanted fax messages. Accordingly, there exists a need for systems and techniques of call screening for fax telephone numbers.

SUMMARY

In one general aspect, a communications system for call screening of fax telephone numbers includes a network configured to receive, from a first client, a fax transmission attempt intended for a second client associated with a customer. A network call processor within the network is configured to screen a first fax telephone number corresponding to the first client and a second fax telephone number corresponding to the second client and to determine whether to deliver a fax transmission to the second client.

Implementations may include one or more of the following features. For example, the network call processor may include a service control point running one or more service program applications. The service program applications may include a fax call screening service program application. The network call processor may include a database for identifying customers that have subscribed to a fax call screening service. The database may be configured to retrieve a subscriber call management profile in response to the second fax telephone number. The subscriber call management profile may include one or more fax telephone numbers specified by the customer. In some cases, the fax telephone numbers specified by the customer may identify parties from which fax transmission may be received. In other cases, the fax telephone numbers specified by the customer may identify parties from which fax transmissions are to be blocked.

In some implementations, the network call processor may receive a query from a signal switching point. The query may include the first fax telephone number and the second fax telephone number. A peripheral device may transmit a notification to the first client that a fax transmission has been rejected. The peripheral device may include an enhanced media resource server and/or a compact service node.

In another general aspect, call processing services are provided to one or more customers by receiving, from a first client, a fax transmission attempt intended for a second client associated with a customer; screening a first fax telephone number corresponding to the first client and a second fax telephone number corresponding to the second client; and determining whether to deliver a fax transmission to the second client.

Implementations may include one or more of the following features. For example, the first client may be notified that a fax transmission has been rejected. In addition, one or more fax telephone numbers may be received from the customer.

Aspects of the present invention may be implemented by an apparatus and/or by a computer program stored on a computer readable medium. The computer readable medium may comprise a disk, a client device, a network device, and/or a propagated signal.

Other features and advantages will be apparent from the following description, including the drawings, and from the claims.

DETAILED DESCRIPTION

Figure 1:
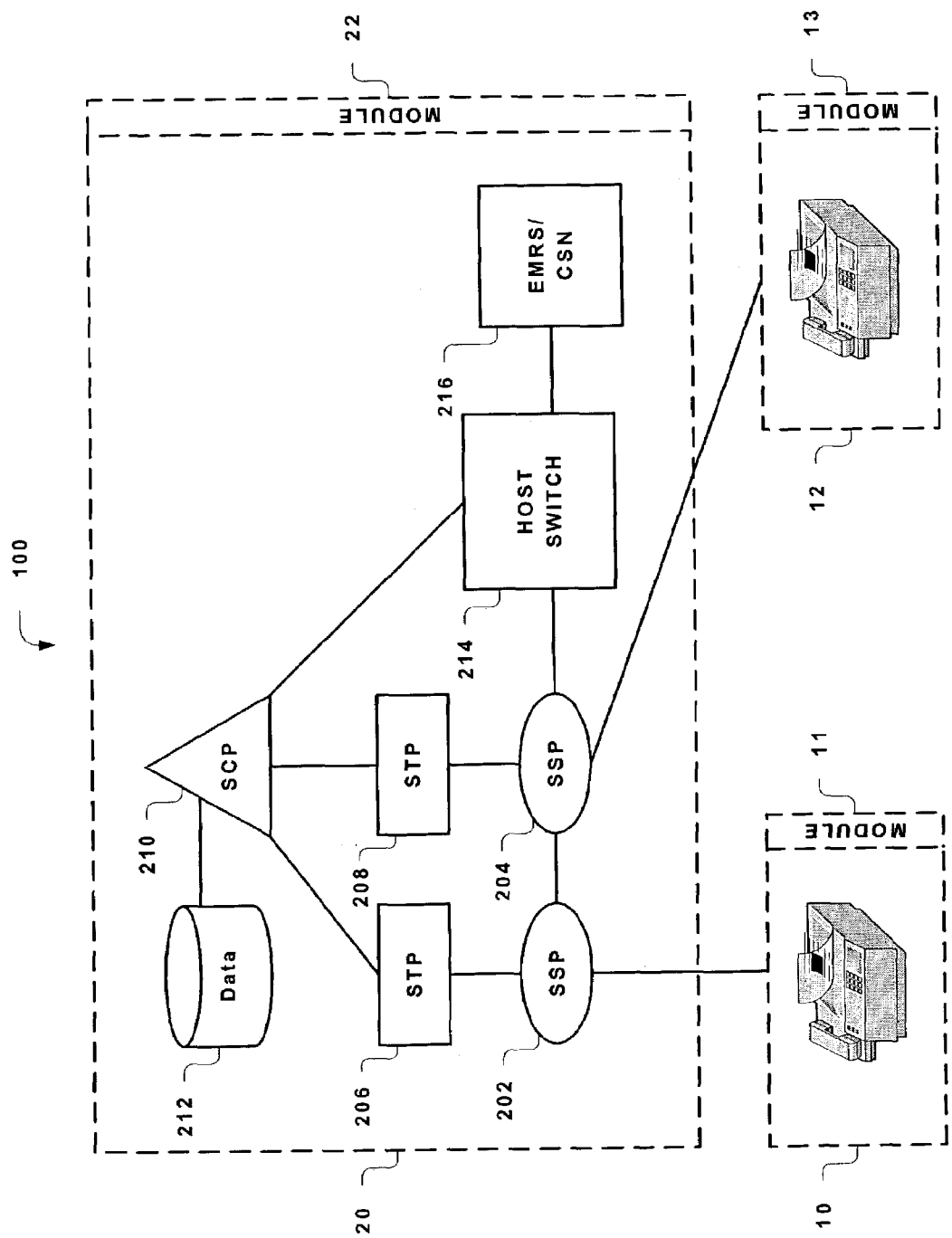
FIG. 1 illustrates one embodiment of a communications system according to aspects of the present invention.

FIG. 1 illustrates one embodiment of a communications system 100 for call screening of fax telephone numbers according to aspects of the present invention. As shown, the communications system 100 includes a first client 10 and a second client 12 connected to an Advanced Intelligent Network (AIN) 20. In some implementations, the AIN 20 may be integrated with a public switched telephone network (PSTN) and utilized by a Local Exchange Carrier (LEC) to provide call processing features and telecommunications services that are not embedded within conventional switching circuits of the PSTN. Network elements of the AIN 20 may communicate using triggers that define a set of services available to telecommunications customers—that is, each trigger may define services associated with a particular customer. For example, a termination attempt trigger (TAT) may define a service employed for a telephone number terminating at a customer's premises that provides call screening for fax telephone numbers.

The first client 10 and the second client 12 may be configured to communicate with each other through the AIN 20.

Each client 10,12 may be associated with a particular telecommunications customer (i.e., end-user) and be configured to access telecommunications services provided by the AIN 20. The clients 10,12 and the AIN 20 generally may include hardware and/or software components for communicating through wired and/or wireless communication pathways. The clients 10,12 and the AIN 20 may be structured and arranged to communicate using various communication protocols (e.g., SS7, TCP/IP, BRI/PRI, X.25, HTTP, WAP) to establish connections between elements and/or to operate within or in concert with one or more other systems (e.g., PSTN, the Internet, and/or the World Wide Web).

As shown, the clients 10,12 and the AIN 20 each include one or more devices operating under the direction of an associated control module—i.e., a first client module 11, a second client module 13, and an AIN module 22. The broken lines are intended to indicate that in some cases, the control modules or portions thereof considered collectively, may instruct one or more elements of the associated systems to operate as described.

One example of a control module is a software application (e.g., operating system, browser application, micro-browser application, server application, proxy application, gateway application, tunneling application, ISP application, and/or other communication application) running on one or more devices that commands and directs communications. Other examples include a computer program, a piece of code, an instruction, another device, or some combination thereof. The control module may be implemented as software code utilizing any suitable computer language (e.g., Java, Perl, C or C++) using object-oriented techniques, for example. The control module also may be a computer, such as a workstation or PC, a microprocessor, a network server, a Java virtual machine, or an application specific integrated circuit, using any suitable type of computer instructions.

A control module (e.g., client modules 11,13 and/or AIN module 22) may be embodied permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a general or special purpose computer system, such that if the storage media or device is read by the computer system, the functions described herein are performed.

As depicted in the embodiment of FIG. 1, each of the clients 10,12 may include a device such as a fax machine for communicating with each other through the AIN 20. In other embodiments, a client may include, for example, a wireless telephone, a landline telephone, a personal computer (PC), an Internet-enabled personal digital assistant (PDA), an Internet-enabled mobile telephone, an interactive pager, a network server, a modem, a processor, a private branch exchange (PBX) switching system, and/or any other terminating piece of customer equipment having fax capabilities. In general, the network devices of the AIN 20 may include any type of computer, server, component, machine, tool, equipment, and/or combination thereof capable of operating as described.

In one embodiment, the AIN 20 includes several Service Switching Points (SSP) switches 202, 204. For brevity, only two SSP switches are depicted (i.e., a first SSP switch 202 and a second SSP switch 204). It is to be understood, however, that the AIN 20 may include a large number of SSP switches depending on the requirements of a particular LEC, for example.

In general, each SSP 202, 204 functions as an interface between telecommunications customers and the AIN 20. In some implementations, each of the SSP switches 202, 204 may include or form part of an end office (EO) switch of a LEC. Each SSP switch 202, 204 may include transmitters, receivers, and switching devices for providing either digital or analog telephone service and for performing switching functions to permit communication between telecommunications customers. The SSP switches 202, 204 also may perform various communications functions such as user identification, subscription verification, location detection, mobile tracking, call processing, call routing, and/or other signaling functions necessary to control calls to and from other telecommunications and data systems.

In one embodiment, the first client 10 may communicate with a first SSP switch 202 and the second client 12 may communicate with a second SSP switch 204. In other embodiments, however, both clients 10,12 may communicate with the same SSP switch (e.g., first SSP switch 202 or second SSP switch 204). This may be the case when both clients 10,12 are located in the same region, for example.

In general, the first client 10 and/or the second client 12 may communicate with the AIN 20 over any type of wired and/or wireless communication link. For example, the first client 10 (e.g., fax machine) may communicate with the first SSP switch 202 and the second client 12 (e.g., fax machine) may communicate with the second SSP switch 204 over subscriber lines such as, for example, twisted pair loop circuits and/or trunk circuits (e.g., T-1 circuits) that interconnect telephone drops for telecommunications customer premises and the SSP switches. The communication links or subscriber lines may be dedicated for a specific type of communication (e.g., fax only) and/or be configured for multiple types of communication (e.g., voice, fax, and/or data). Accordingly, the services provided by the AIN 20 are available to both residential and business customers.

In some implementations, the clients 10,12 (e.g., fax machines) may communicate with the SSP switches 202,204 over wireless communications links according to an air-interface communications scheme (e.g., CDMA, TDMA, or GSM). A wireless communication link may include a wireless network having, for example, a Mobile Switching Center (MSC), a base transceiver station (BTS), and/or a tandem office. The clients 10,12 may communicate with the BTS over a radio communications link. The BTS may, in turn, communicate with the MSC through an SS7 switching trunk network or an ISDN, for example. The MSC then may communicate with the SSP switches 202,204 of the AIN 20 through the tandem office.

As illustrated in FIG. 1, the first SSP switch 202 may be connected to a first signal transfer point (STP) 206 and the second SSP switch 204 may be connected to a second STP 208. The SSPs 202, 204 and the STPs 206, 208 may communicate using a switching protocol (e.g., the SS7 switching protocol). In general, each STP 206, 208 may include a multi-port, high-speed packet switch configured to respond to the routing information in the appropriate layer of the switching protocol (e.g., the SS7 switching protocol), and route the data packets to an intended destination.

One intended destination of data packets from the STPs 206, 208 may be a service control point (SCP) 210. The STPs 206, 208 may communicate with the SCP 210 using a switching protocol (e.g., the SS7 switching protocol). The SCP 210 may include one or more intelligent servers and may be associated with one or more databases 212 configured to store network data. The intelligent functionality of the SCP 210 may be implemented by programs, such as one or more Service Program Applications (SPAs) running on the SCP 210.

In some implementations, the SCP 210 may be configured by a SPA, for example, to perform high volume routing services, such as call forwarding and 800 number translation and routing. The SCP 210 also may perform routing and servicing of calls among different LECs. Additionally, the SCP 210 may be used for maintenance of and providing access to the database 212 for authorization of billing, such as credit card validations.

Another of the functions of the SCP 210 may be implementing enhanced call services and/features associated with a particular customer. According to aspects of the present invention, call screening for fax telephone number may be provided as an enhanced calling service. The SCP 210 may perform call screening for fax telephone numbers in conjunction with an associated database 212 that stores customer information. In some implementations, information for a particular customer may be stored as a subscriber call management profile identifying certain enhanced calling services subscribed for by the customer. The call screening for fax telephone numbers functionality may be provided alone and/or along with other enhanced calling services. Some examples of other enhanced calling services that may be provided include, but are not limited to, flexible call forwarding (FCF), caller identification (caller ID), call screening and blocking for both incoming and outgoing calls, privacy director (PD), do not disturb (DND), remote event notification, call waiting, Internet call waiting (ICW), and/or other types of call processing features.

According to one embodiment, the database 212 maintains subscriber call management profiles, and the SCP 210 maintains call-processing logic for accessing the call management profiles through the intelligent server. In some cases, the intelligent server maybe configured to generate an interface document containing a subscriber call management profile in real-time each time access to the profile is sought. The intelligent server may generate the interface document according to different formats depending on the mode of access.

In some implementations, the intelligent server of the SCP 210 may map a call to an audio-based interface document including a subscriber call management profile. To permit a subscriber to access the audio-based interface document, the intelligent may include an audio-based interface interpreter having text-to-speech (TTS) translation and Automatic Speech Recognition (ASR) capabilities. The interpreter may convert the interface document to a voice format (e.g., VoiceXML) such that the parameters of the subscriber call management profile may be rendered to the client 10 (e.g., mobile telephone and/or landline telephone) using the TTS capabilities of the interpreter.

The ASR functionality of the interpreter may permit recognition of certain spoken keywords as commands to perform certain tasks. For example, the interpreter may be programmed to recognize certain keywords as commands to activate or deactivate certain features, or to otherwise modify a subscriber call management profile. In addition, other keywords may be recognized by the interpreter as a command to browse the document.

In addition, to facilitate interfacing with the audio-based interface document, the SCP 210 also may include a DTMF decoder. The DTMF decoder may be programmed to recognize the dialing of certain digits or characters of, for example, a touch-tone telephone, as commands to modify or browse the profile contained in the interface document. For example, characters of a touch-tone telephone may be used to activate or deactivate certain enhanced calling features. In addition, when the subscriber desires to place a call while the call management profile is being rendered to the subscriber, the DTMF decoder may be programmed to recognize a string of digits as a subscriber request to place a call.

In general, the AIN 20 may be configured to provide telecommunications services to customers in response to a query generated from a trigger. In one implementation, the SSP switches 202,204 may implement a set of triggers for processing calls. The set of triggers may include originating triggers for processing calls originating from a customer premises and terminating triggers for processing calls terminating at a customer premises. For example, the SSP 202 may receive an incoming call to a particular number and implement a terminating trigger associated with the called party. The SSP 202 also may receive an outgoing call from a particular number and implement an originating trigger associated with the calling party.

The trigger causes the SSP 202 to generate a message in the form of a query that is to be sent to an appropriate destination. The query may be formatted, for example, according to SS7 TCAP (Transaction Capabilities Application Part) formats. The query typically may be a data packet including an origination point code and a destination point code. For instance, the origination point code may identify a particular customer (i.e., calling party) by the telephone number initiating a call, and the destination point code may identify a particular customer (i.e., called party) by the telephone number that was dialed.

The AIN 20 further includes a host switch 214 in communication with one or more SSP switches (e.g., SSP switch 204) and/or one or more SCPs (e.g., SCP 210). The host switch 214 may communicate with the SSP switch 204 and/or the SCP 210 through a communication link using a communication protocol, such as, for example, the SS7 and/or X.25 communications protocol. In general, the host switch 214 may route instructions for providing an enhanced calling service, in particular, call screening for fax telephone numbers.

The instructions may be routed by the host switch 214 to an enhanced media resource server and/or compact service node (EMRS/CSN) 216. The EMRS/CSN 216 may be connected to the host switch 214 through a communications link using Integrated Service Digital Network (ISDN) or PRI/BRI delivery. The EMRS/CSN 216 may include an intelligent server and/or any other AIN-compliant resource, such as, for example an AIN/IP (Intelligent Peripheral).

In one embodiment, the EMRS/CSN 216 may be configured to respond to instructions for performing call screening for fax telephone numbers. The EMRS/CSN 216 may perform functions including terminating attempted fax transmissions and notifying senders of rejected fax transmissions. The EMRS/CSN 216 may be capable of providing an audio connection and transferring a significant amount of data to a subscriber over a switched connection during or following a call. Additionally, the EMRS/CSN 216 may include voice and DTMF signal recognition devices and/or voice synthesis devices.

Other implementations of the AIN 20 depicted in FIG. 1 may include additional network elements. For example, each of the STPs 206, 208 and the SCP 210 may be provided as a mated redundant pair for enhancing network reliability. In addition, the AIN 20 may include one or more SESS Network Access Points (NAPs) in communication with each of the STPs 206, 208 for detecting network conditions.

Figure 2:
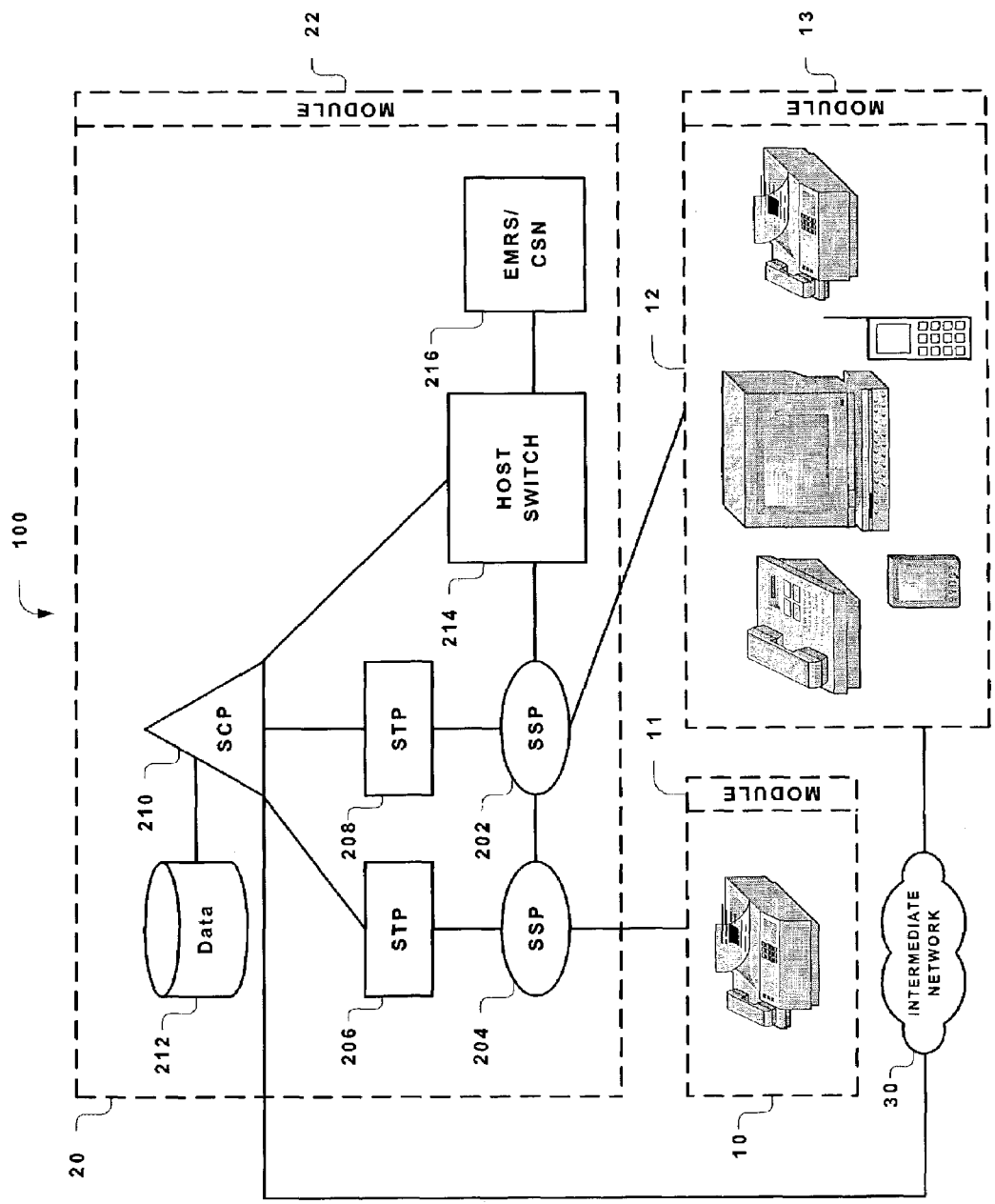
FIG. 2 illustrates one embodiment of a communications system according to aspects of the present invention.

FIG. 2 illustrates another embodiment of a communications system 100. As shown, the communications system 100 includes a client 12 connected to an Advanced Intelligent Network (AIN) 20 and an intermediate network 30. As shown, the client 10 and the AIN 20 each include one or more devices operating under the direction of an associated control module, i.e., a client module 12 and an AIN module 22. The broken lines are intended to indicate that in some cases, the control module (e.g., client module 12 and/or AIN module 22), or portions thereof considered collectively, may instruct one or more elements of the associated systems (e.g., client 10 and/or AIN 20) to operate as described. The client 10 and/or the AIN 20 may communicate with the Internet 30 through TCP/IP or WAP communications links, for example.

In some embodiments, the intermediate network 30 may form part of the Internet and/or World Wide Web (Web). For security purposes, firewalls may be provided between the Internet 30 and other elements of the communications system 100. Information on the Internet or Web may be represented by specially formatted text files (e.g., Web pages) written in Hypertext Markup Language (HTML) or some other markup language, such as XML, HDML, and/or VRML. Each text file may be identified by a network address such as a Universal Resource Locator (URL). A typical Web page may include one or more hyperlinks referring to the network addresses of other Web pages. Hyperlinks may be displayed as underlined text or graphical images that when clicked, send a request for the associated page. For example, when a hyperlink in a home page is selected, a request is sent out by the client to the address specified in the hyperlink, and the associated Web page is downloaded and displayed, replacing the home page on the user's screen with the associated Web page.

The intermediate network 30 also may include and/or form part of a proprietary network such as a Central Office Wide Area Network (COWAN). The intermediate network 30 also may include or form part of an information delivery system such as a telephone network (e.g., analog, digital, wired, wireless, PSTN, ISDN, or xDSL), a radio network, a television network, a cable network, a satellite network, and/or any other communications network configured to carry data. Each network may include one or more elements such as, for example, intermediate nodes, proxy servers, routers, switches, adapters, and wired or wireless data pathways, configured to direct and/or deliver data.

In some implementations, the intermediate network 30 may include, for example, Mobitex® technology of the Cingular Interactive Intelligent Wireless Network service provided by Cingular Wireless. Aspects of the Mobitex® network may include a two-way wireless data service capable of connecting to other complimentary networks. A wireless data service such as the Mobitex® network includes a hierarchy of communications systems that can provide nationwide wireless service through a network of base stations and local switches under the control of higher order regional switches or exchanges.

In general, the client 12 may be associated with a particular telecommunications customer (i.e., end-user) and configured to access telecommunications services provided by the AIN 20. As depicted in the embodiment of FIG. 2, the client 12 may include a device such as a landline telephone, a personal computer (PC), a fax machine, an Internet-enabled personal digital assistant (PDA), and/or an Internet-enabled mobile telephone for communicating with the AIN 20. In other embodiments, the client 10 may include, for example, a workstation, a laptop, an interactive pager, a network server, a modem, a processor, a private branch-exchange (PBX) switching system, and/or any other terminating piece of customer equipment capable of accessing the AIN 20. In general, the network devices of the AIN 20 may include any type of computer, server, component, machine, tool, equipment, and/or combination thereof capable of operating as described below.

The AIN 20 depicted in FIG. 2 further includes first and second SSP switches 202, 204, first and second STPs 206, 208, a SCP 210, a database 212, a host switch 214, and an EMRS/CSN 216. Such elements generally may be structured and arranged as described above in conjunction with FIG. 1. It is to be understood, however, that other implementations of the AIN 20 shown in FIG. 2 may include additional network elements.

Figure 3:
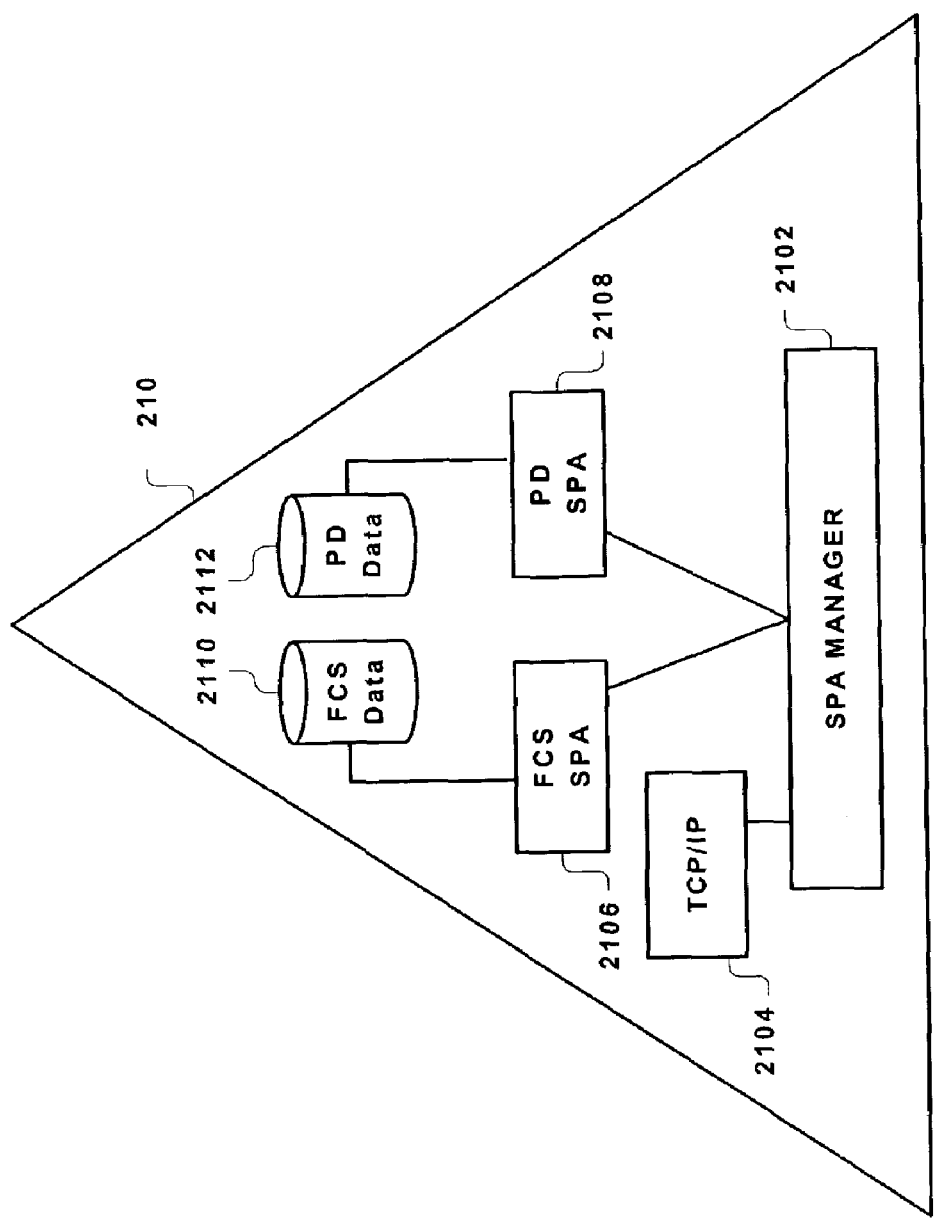
FIG. 3 illustrates one embodiment of a service control point according to aspects of the present invention.

FIG. 3 illustrates one embodiment of a SCP 210 that may be utilized by the AIN 20 in accordance with aspects of the present invention. In this embodiment, the SCP 210 includes a SPA manager 2102 configured to receive a query generated by a trigger (e.g., TAT) from a SSP switch, for example. The SCP 210 further includes a TCP/IP interface 2104 in communication with the SPA manager 2102. The TCP/IP interface 2104 generally may be configured to receive TCP/IP requests from customers through the intermediate network 30, for example, and direct such requests to the SPA manager 2102. In one implementation, a TCP/IP request may include a command to manipulate certain features and/or services associated with a particular customer.

In response to the request, the SPA manager 2102 may interrogate a SPA associated with a particular enhanced service. As described above, the subscriber call management profile may identify one or more enhanced services associated with the customer. In the embodiment of FIG. 3, for example, the customer may be provided with a fax call screening (FCS) service through a FSC SPA 2106 and an associated FCS database 2110 and may be provided with a privacy director (PD) service through a PD SPA 2108 and an associated PD database 2112. In general, the FCS SPA 2106 may be configured to send instructions to provide FCS services for customers that are identified in the FCS database 2110. Similarly, the PD SPA 2108 may be configured to send instruction to provide PD services for customers that are identified in the PD database 2112.

By using an Internet (e.g., Web) interface such as an Internet-enabled device having browsing software, the customer may manipulate his/her subscriber call management profile. In one implementation, the customer may specify a logical sequence for available services. In another implementation, the customer may specify certain times for providing available services.

Figure 4:
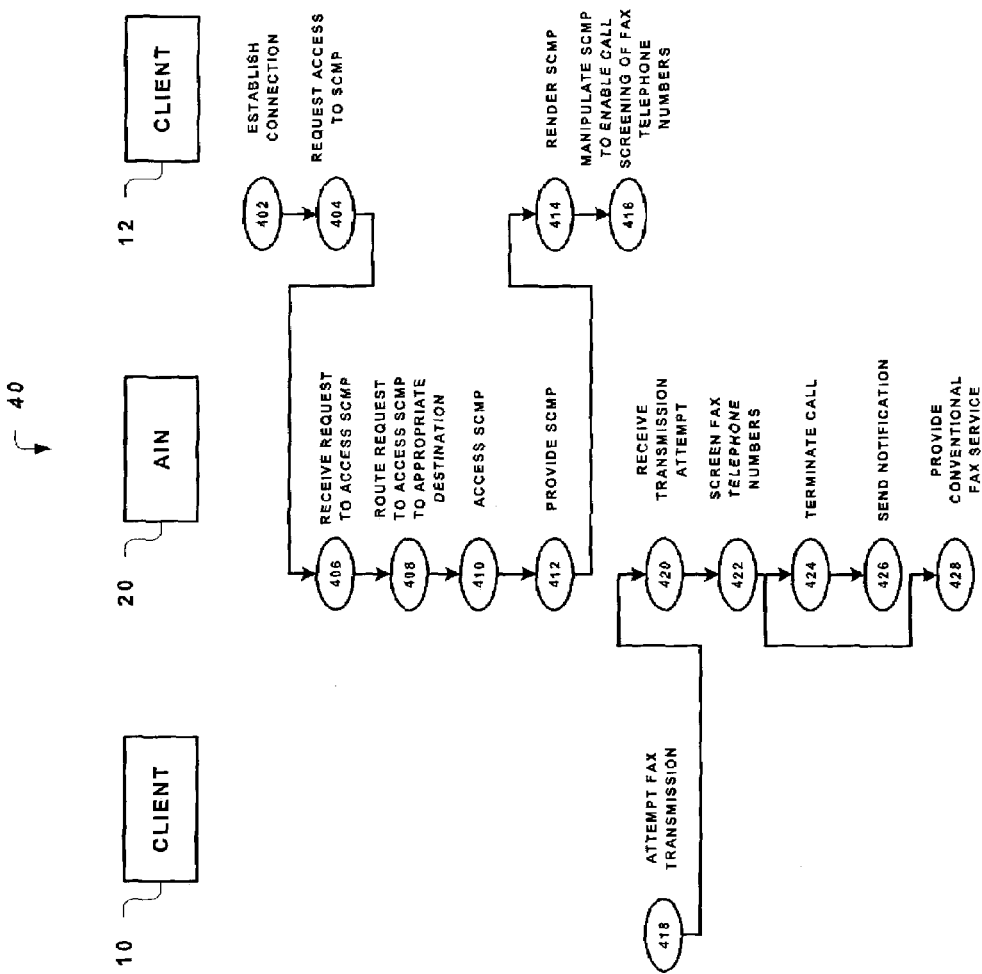
FIG. 4 is one embodiment of a communications method according to aspects of the present invention.

Referring to FIG. 4, aspects of the present invention include a procedure 40 for providing call screening for fax telephone numbers. The procedure 40 may be implemented by any suitable type of hardware (e.g., device, computer, computer system, equipment, component); software (e.g., program, application, instructions, code); storage medium (e.g., disk, external memory, internal memory, propagated signal); or combination thereof.

In one implementation, a client 12 and an AIN 20 interact according to the procedure 40. In general, the client 12 and the AIN 20 may be structured and arranged as shown in any one of FIGS. 1-3 and/or any other configuration consistent with aspects of the present invention.

The procedure 40 begins when a customer uses the client 12 to establish a connection to the AIN 20 (step 402) and requests access to a subscriber call management profile (step 404). According to one embodiment, the customer may use a client 12 such as a wireless telephone and/or a landline telephone, for example, to connect to the AIN 20 and request access to a subscriber call management profile through a telephone interface. For example, the customer may dial a certain administration telephone number dedicated for accessing the subscriber call management profile.

In another embodiment, the customer may use an Internet-enabled device to establish a connection to the AIN 20. In some implementations of this embodiment, the client 12 dials an Internet access number and establishes a connection to a particular network address (e.g., URL, IP address) of the AIN 20 through the intermediate network 30.

The AIN 20 receives the request to access a subscriber call management profile (step 406) and then routes the request to an appropriate destination (step 408). According to one embodiment, the AIN 20 receives the request for access as a call placed to an administration telephone number. In response to the call placed to the administrative number, the SSP 204 implements an originating trigger and generates a query. The query may be formatted, for example, according to SS7 TCAP (Transaction Capabilities Application Part) formats. The query may include an origination point code identifying the customer (i.e., calling party) based on the telephone number associated with the wireless and/or landline telephone used to place the call. The query also may include a destination point code identifying the location (e.g., network address) of the SCP 210. The destination point also may identify a particular function (e.g., FCS SPA 2106) running on the SCP 210 for managing subscriber call management profiles.

According to another embodiment, the AIN 20 may receive the request for access to a subscriber call management profile from an Internet-enabled device. In some implementations of this embodiment, the AIN 20 may receive the request for access in connection with a dialed Internet access number. In some cases, a customer may be presented with a user interface after connecting to a Web server associated with the access number. The user interface may prompt the customer to enter a telephone number for identifying the customer as well as authorization information such as a user I.D. and password, for example. While connected to the Internet, the customer may use the Internet-enabled device to route a request for access to a subscriber call management profile through the Internet to the SCP 210.

In response to the received request, the AIN 20 accesses a particular subscriber call management profile (step 410) and provides the accessed subscriber call management profile to the client 12 (step 412). According to one embodiment, the SCP 210 may receive a query generated from trigger. The query may include an originating point code identifying a particular customer that is requesting access to a subscriber call management profile by a telephone number, for example. The SCP 210 may interrogate the database 212 and retrieve a subscriber call management profile corresponding to the identified customer. The SCP 210 may provide the accessed subscriber call management to the client 12 by routing a voice-interface document through the STP 208 and the second SSP switch 204.

According to another embodiment, the SCP 210 may include an intelligent server accessible through the intermediate network 30 (e.g., the Internet). In some implementations, the intelligent server of the SCP 210 may receive a TCP/IP request and, in turn, interrogate the database 212. The intelligent server of the SCP 210 may identify a particular customer according to an entered telephone number and retrieve a corresponding subscriber call management profile from the database 212. The intelligent server of the SCP 210 may provide the accessed subscriber call management to the client 12 by routing an Internet (e.g., Web, HTML, XML) interface document through the intermediate network 30.

The client 12 renders the subscriber call management profile (step 414). According to one embodiment, a customer may render the subscriber call management profile through a voice interface, such as a wireless or landline telephone. In such cases, a voice interface document containing the subscriber call management profile may be presented in an audio format. The customer may manipulate the subscriber call management profile by inputting data through the voice interface. For example, the customer may use voice commands and/or dialing commands to manipulate subscriber call management profile as desired.

According to another embodiment, a customer may render the call management profile through an Internet (e.g., Web) interface such as an Internet-enabled device including browsing software. In such cases, an Internet (e.g., Web, HTML, XML) interface document containing the subscriber call management profile may be presented in a viewable format.

The Internet (e.g., Web) interface may present the document as visual outline of the subscriber call management profile and provide the customer with the ability to manipulate the subscriber call management profile as desired. For example, the subscriber may use browser commands such as key stokes and/or mouse clicks to make modifications to the subscriber call management profile.

Using the client 12, the customer then manipulates the subscriber call management profile to enable call screening of fax telephone numbers (step 416). In one implementation, manipulating the subscriber call management profile may involve specifying one or more fax telephone numbers. For example, the customer may specify only those fax telephone numbers from which transmissions are to be received. Accordingly, transmissions from all other fax telephone numbers will be blocked in this scenario. The customer also may identify specific fax telephones to block. Accordingly, transmission from all unblocked fax telephone numbers may be received.

In one implementation, after call screening of fax telephone numbers has been enabled, a first client 10 attempts a fax transmission to a second client 12 (step 418). For example, a first fax machine (i.e., the first client 10) may attempt transmission by dialing a fax telephone number of a second fax machine (i.e., the second client 12). According to this implementation, the AIN 20 may receive the transmission attempt (step 420) and then may screen a fax telephone number associated with the first client 10 and a fax telephone number associated with the second client 12 to determine whether to deliver the fax transmission to the second client 12 (step 422).

In one embodiment, when the fax telephone number of the second client 12 is dialed, the call (i.e., transmission attempt) from the first client 10 may be received at the first SSP switch 202 and then forwarded to the second SSP switch 204, which is associated with the second client 12. In response to the call, a trigger (e.g., TAT) at the SSP switch 204 may send a query through the STP 208 to the SCP 210. In another embodiment, upon receiving the call, a trigger (e.g., TAT) at the SSP switch 202 may send a query through the STP 206 to the SCP 210.

Upon receiving a query, the SCP 210, in turn, may interrogate the database 212 to determine whether call screening of fax telephone numbers should be implemented. In general, the SCP 210 will make this determination based on the subscriber call management profile of the called party. For example, the SCP 210 first may screen the fax telephone number associated with the second client 12 (i.e., the called party), retrieve a subscriber call management profile corresponding to the screened fax telephone number, and determine whether the subscriber call management profile indicates that FCS service is to be provided. If the FCS service is to be provided, the SCP 210 then may screen the fax telephone number associated with the first client 10 (i.e., the calling party), ascertain if the screened fax telephone number is specified by the subscriber call management profile, and determine whether to block the fax transmission. As described above, in some cases, parties corresponding the specified fax telephone numbers may be allowed to transmit and, in other cases, parties corresponding the specified fax telephone numbers may be blocked from transmitting.

If the AIN 20 determines that the fax transmission is to be blocked, the call is terminated (step 424) and the first client 10 is notified of the termination (step 426). If, on the other hand, the AIN 20 determines that the fax transmission is to proceed, conventional fax service may be provided for the call (step 428).

In one embodiment, the results of the determinations made by the SCP 210 may be sent as an instruction (e.g., return packet) from the SCP 210 through the STP 208 to the SSP switch 202. The instruction may include, for example, a command to block a certain fax transmission and provide a notification to the sender. The instruction may be routed from the SSP 202 to the host switch 214 and ultimately to the EMRS/CSN 216. In some cases, the instruction may bypass the STP 208 and the SSP 202 and be routed more directly to the EMRS/CSN 216.

The EMRS/CSN 216 may receive the instruction and, in response, determine the most efficient way to block the fax transmission and select an appropriate notification. The EMRS/CSN 216 then may transmit instructions for how the SSP switch 202 and/or the SSP switch 204 are to process the call. The call processing instructions may be sent, for example, from the EMRS/CSN 216 through the host switch 214 and then to the SSP switch 202 and the SSP switch 204. In some cases, the SSP switch 202 and/or the SSP 204 may be instructed to drop the call and the SSP switch 204 may be instructed to send a notification to the client 10 according to aspects of the present invention.

In one implementation, the AIN 20 (e.g., SSP switch 204) may notify the first client 10 of a fax attempt termination by sending a message. In general, the message may indicate to the sender that the intended recipient has rejected the attempted fax transmission. In some cases, the message may be sent as a return fax message to the client 10. For example, rather than receiving confirmation that a fax transmission is successful, the client 10 may receive a rejection message instead. In other cases, the message may include text, images, or audio content for indicating that the fax transmission has been denied. For example, the AIN 20 (e.g., EMRS/CSN 216) may perform a reverse lookup of the fax telephone number of the calling party to find alternate contact information (e.g., telephone number, e-mail address, mailing address, etc.). The AIN 20 may communicate with the calling party using such alternate contact information and notify the calling party of the rejection. In some situations, the message may instruct the calling party to cease further attempts to contact the called party.

A number of implementations have been described. Nevertheless, it will be understood that various modifications may be made and that other implementations are within the scope of the following claims. For example, in some cases, manipulating the subscriber call management profile also may involve adding and/or removing certain features and/or services. For example, using the voice interface and/or the Internet (e.g., Web) interface, the customer may activate or deactivate certain calling features, such as FCS and/or any other type of call processing service and/or feature.

What is claimed is:

1. A communications system for providing call processing services to one or more customers, the system comprising:

a network configured to receive, from a first client, a fax transmission attempt intended for a second client associated with a customer;

a network call processor within the network, the network processor configured to screen a first fax telephone number corresponding to the first client and a second fax telephone number corresponding to the second client and to determine whether to deliver a fax transmission to the second client based on a subscriber call management profile associated with the second client, wherein the subscriber call management profile comprises one or more fax telephone numbers that are specified by the subscriber to be blocked from transmitting to the subscriber; and a peripheral device in communication with the network call processor for notifying the first client that a fax transmission has been blocked from transmitting based on the subscriber call management profile.

2. The communications system of claim 1, wherein the network call processor comprises a service control point running one or more service program applications.

3. The communications system of claim 2, wherein the service program applications comprise a fax call screening service program application.

4. The communications system of claim 1, wherein the network call processor comprises a database identifying customers that have subscribed to a fax call screening service.

5. The communications system of claim 4, wherein the database is configured to retrieve the subscriber call management profile in response to the second fax telephone number.

6. The communications system of claim 5, wherein the subscriber call management profile comprises one or more fax telephone numbers specified by the customer.

7. The communications system of claim 6, wherein the fax telephone numbers specified by the customer identify parties from which fax transmissions may be received.

8. The communication system of claim 1, wherein the network call processor receives a query from a signal switching point, the query including the first fax telephone number and the second fax telephone number.

9. The communications system of claim 1, wherein the peripheral device for notifying the first client that a fax transmission has been blocked sends a rejection fax.

10. The communication system of claim 1, wherein the peripheral device comprises at least one of an enhanced media resource server and a compact service node.

11. A communications method for providing call processing services to one or more customers, the method comprising:

receiving, from a first client, a fax transmission attempt intended for a second client associated with a customer;

screening a first fax telephone number corresponding to the first client and a second fax telephone number corresponding to the second client;

determining whether to block a fax transmission to the second client based on a subscriber call management profile associated with the second client, and notifying the first client that a fax transmission has been blocked based upon the subscriber call management profile.

12. The method of claim 11, wherein notifying the first client that a fax transmission has been blocked includes sending a rejection fax.

13. The method of claim 11, further comprising receiving one or more fax telephone numbers from the customer.

14. A controller for providing call processing services to one or more customers, the controller comprising:
- means for receiving, from a first client, a fax transmission attempt intended for a second client associated with a customer;
- means for screening a first fax telephone number corresponding to the first client and a second fax telephone number corresponding to the second client;
- means for determining whether to transmit a fax transmission to the second client based on a subscriber call management profile associated with the second client; and
- means for notifying the first client that a fax transmission has been blocked based on the subscriber call management profile.

15. The controller of claim 14, further comprising means for sending a rejection fax.

16. The controller of claim 14, further comprising means for receiving one or more fax telephone numbers from the customer.

17. The controller of claim 14, wherein the controller comprises a network device.

18. The controller of claim 14, wherein the controller comprises a computer program stored on a computer-readable medium.

19. The controller of claim 18, wherein the computer-readable medium comprises at least one of a disk, a client device, and a network device.

\* \* \* \* \*